June 23, 1959  H. R. FEHLING  2,891,511
WRITING INSTRUMENTS OF THE BALL TIP TYPE
Filed Aug. 12, 1954  5 Sheets-Sheet 1
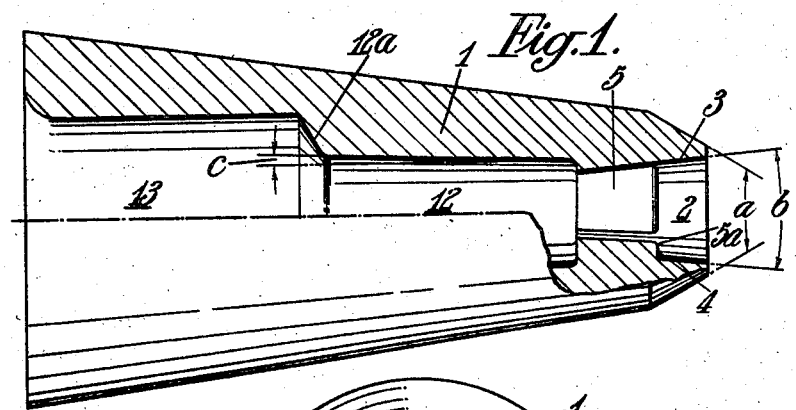
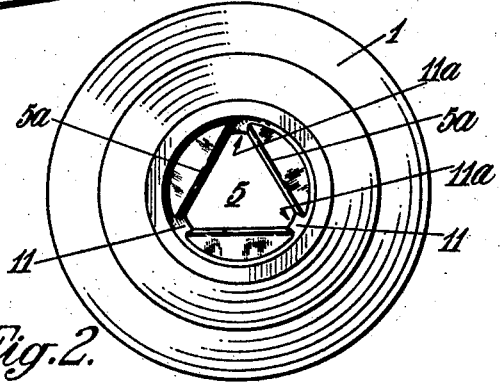
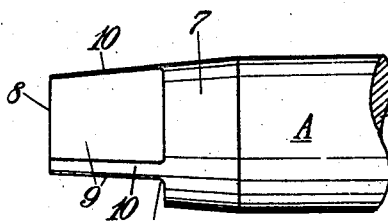
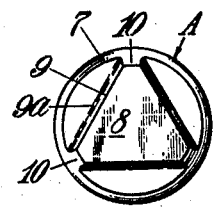
Inventor
H. R. Fehling

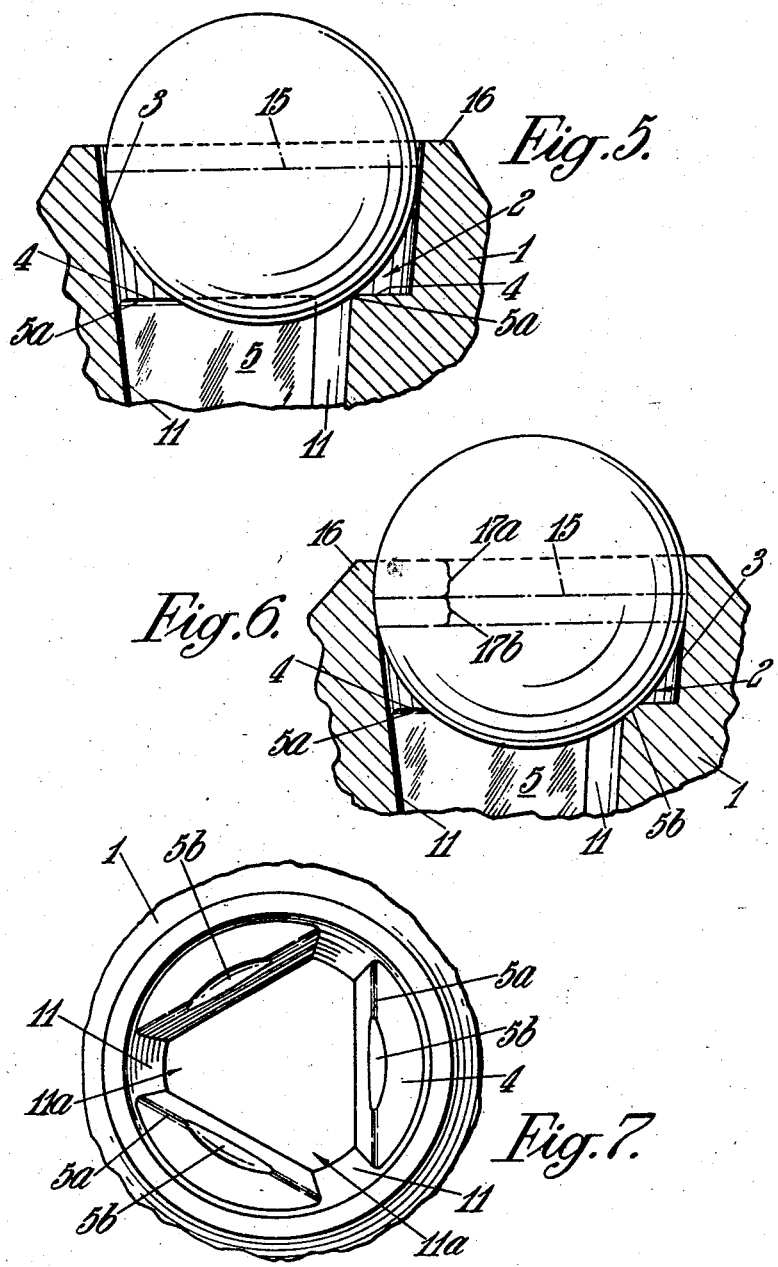

June 23, 1959  H. R. FEHLING  2,891,511
WRITING INSTRUMENTS OF THE BALL TIP TYPE
Filed Aug. 12, 1954  5 Sheets—Sheet 5

Inventor
H. R. Fehling
By Glenn K. Downing & Seattle
Attys.

2,891,511

WRITING INSTRUMENTS OF THE BALL TIP TYPE

Hans Reinhard Fehling, London, England, assignor to D. C. B. Limited, London, England Application August 12, 1954, Serial No. 449,404

Claims priority, application Great Britain August 13, 1953

6 Claims. (Cl. 120—42.4)

The invention concerns improvements in and relating to those writing instruments which are generally known as ball point pens and which have a writing extremity or tip in which an ink track laying ball is revolubly retained in and protrudes from a socket or housing to the base of which a feed duct opens for supplying ink to the housing and ball from a reservoir connected or connectable to the tip.

These improvements are directed to the provision of: new methods of manufacturing ball point tips calculated to expedite their production with a uniformly high degree of accuracy; a new mode of seating the ball in its housing and the prevention of the creeping of certain inks along the exterior of the tip or along other surfaces.

Hitherto it has been the practice to manufacture ball point tips of the type described by machining and/or punching operations on automatic lathes, both of which operations require skilled labor for setting and incur a certain percentage of rejects and loss in swarf or scrap. Moreover it is difficult to obtain a uniformly high degree of accuracy at high production rates. Accordingly for some time there has been a need or desire for a better and more efficient mode of manufacture which would combine great uniformity and accuracy with a high rate of production while being capable of being carried out with less skilled labour.

Die-casting presents itself as an attractive mode of producing the tip carcass but this method presents a problem that hitherto it has not been practicable to die-cast satisfactorily so small an article as a ball point writing instrument tip, having the internal configuration and accuracy required, in the customary metals or alloys used in die-casting and deemed suitable for the present purpose, viz., aluminium and zinc alloys.

Die-castings produced in any of these metals require subsequent machining and if this is required, die-casting would present little or no advantage over production wholly by machining. Accordingly an aim of the present invention is the production of a finished tip carcass or body portion by die-casting alone with no machining.

With a view to solving the die-casting problem the inventor has caused experiments to be carried out and has found that for die-casting the small and intricate tips, the casting metal must have the following characteristics: a relatively low melting point and good flow properties at low temperature as compared with those metals employed in present-day die-casting methods, a volatilisation temperature well above the said melting point and be substantially free from oxidation at the casting temperature.

The inventor has further found in his researches that some tin alloys possess, contrary to expectations, the above required characteristics and can be so chosen as to possess the hardness and wear-resisting properties suitable for ball point writing instrument tips.

The preferred carcass or body structure of writing instrument tips to be produced by die-casting includes a ball housing having a truncated conical walling below the plane of the equator of the ball and a feed duct opening, which communicates with the base of said housing, affording ball seating edge(s) common to the duct and the base or truncation surface of the housing, of noncircular (preferably polygonal) form in plan.

The preferred die-casting structure for producing a writing instrument tip in tin alloy comprises an outer mould suitably shaped for the external contour of the tip, a one-piece die core member corresponding to the shaping chosen for the ball housing and feed duct, and terminating at the transverse plane of the housing and duct opening, and an opposed die core means extending to said plane and corresponding with the chosen form of the ink supply passage from the reservoir to said feed duct.

In reference to the production of ball point writing instrument tips by die-casting the term "tin alloy" as used herein and in the claims means an alloy in which tin is alloyed with a hardening metal or metals in proportions such as to preserve the low temperature flow characteristics, the high temperature volatilisation and slowness of oxidation of tin to an extent sufficient to enable tips having consistent accuracy of shape to be produced by die-casting, notwithstanding their small size while at the same time such tips have adequate wear-resisting qualities.

It is well known that in ball point pens ink is liable to accumulate around the protruding portion of the ball and the adjacent rim of the ball housing. This accumulation is not fundamentally objectionable since it is partially, if not wholly, taken up in the revolution and counter revolution of the ball in writing, but with oily or non-drying or non-congealing inks, especially inks made with certain dyes, e.g. oil soluble Victoria Blue, there is a tendency for some of this accumulation (particularly if such becomes excessive such as when, due to wear, the clearance between the ball and rim of the housing is increased and the flow of ink is becoming freer than normal), to spread or creep along the exterior surface of the tip which the fingers of the writer are liable to come in contact and become contaminated.

The oily or non-drying or non-congealing inks referred to herein are such as contain an oleaginous solvent (for instance olein, castor oil, ricinoleic acid or a combination thereof), an adhesive thickener (for instance colophony) and a dye (for instance Victoria Blue). A specific example of a "creeping" ink is as follows:

| | Percent |
|---|---|
| Victoria Blue | 19.5 |
| Waxoline Violet | 0.5 |
| Castor Oil | 13.0 |
| Oleic Acid | 17.0 |
| Ricinoleic Acid | 30.0 |
| Colophony | 20.0 |

Heretofore no means have been found for mitigating or eliminating this nuisance and with a view to solving this ink creep problem the inventor has caused to be carried out many experiments to ascertain whether any particular character of surface was less susceptible to ink creep than another and has found that tin or a tin alloy affords a surface which inhibits the creep of oily or non-drying or non-congealing inks.

It will be evident from the above, therefore, that tin may be employed to solve both the problem of die-casting ball point tips and that concerned with ink creep.

As ink creep makes itself evident on the exterior surface of the tip the benefit of the ink creep inhibition may be achieved by making the tip as a whole of a suitable tin alloy or by plating or coating the exterior of a nib made of any metal or material (including a plastic such as nylon) with tin or tin alloy.

Accordingly the invention embraces a ball point tip having at least a smooth exterior surface or a portion of the exterior surface of tin alloy.

With respect to the inhibition of ink creep as discussed herein the term "non-creep tin alloy" means a metal in which tin (or another metal having like ink creep inhibiting properties to that of tin) is present in proportions such as to endow the writing instrument tip with the said ink creep inhibiting property, and it is to be understood that the term also includes the more or less pure metal—tin (or other creep inhibiting metal) when used for plating or surfacing the exterior of a tip made of any material susceptible of being so coated.

A further feature of improvement is concerned with a mode of forming base seatings for the ball within its housing and this improvement consists in shaping ball seatings on non-circular or polygonal edges of the opening common to the duct and the base or truncation surface of the housing, by bringing axial pressure to bear on the ball when inserting in the housing and lying on the said edges, automatically to produce arcuate indentations on the said edges corresponding with or forming counterparts of fractions of the ball sphere.

The accompanying drawings illustrate, by way of example, structural forms of a ball point writing instrument tip and tools for the production of such according to preferred modes of carrying the improvements into effect, the figures in the drawings being all drawn to a considerably enlarged scale.

Figure 1 is a part longitudinal section and outside elevation, of a ball point tip carcass or body portion (minus the ball) showing the ball housing and adjacent feed duct according to one form of the invention with suitable ink supply passages or ducts of larger size which lead from an ink reservoir of the known kind (not shown).

Figure 2 is an end view of a tip according to Figure 1 looking from the right-hand of the figure.

Figure 3 is a fragmentary outside elevation of a die core for producing by die-casting the ball housing and feed duct as seen in Figure 1.

Figure 4 is an end view of the die core seen in Figure 3.

Figure 5 is a longitudinal section (with a ball preliminarily inserted in position) of the outer fragment of a tip such as seen in Figure 1.

Figure 6 is a similar view to Figure 5 but with the ball in position and impressed into the edge of the feed duct to form the base seatings for the ball and the constriction of the housing rim for retaining the ball in position and forming lateral seatings above and below the equator of the ball.

Figure 7 is a plan view according to Figure 6 with the ball omitted to show the impressed or indented partial spherical base seatings.

Figure 10:
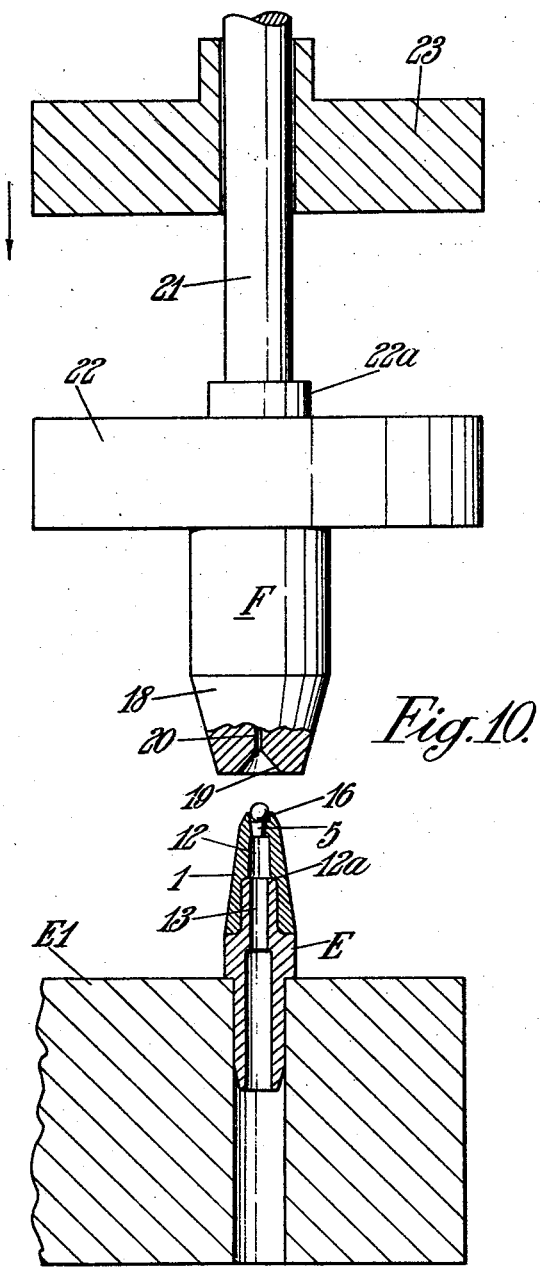
Figure 10 is an elevation partly in section of the tools for securing the ball revolubly in position, the lower part of the figure showing tip supporting means and the upper part of the figure illustrating the tool for peening or constricting the outer rim of the socket or housing in the outer end of the tip upon the ball.
Figure 11:
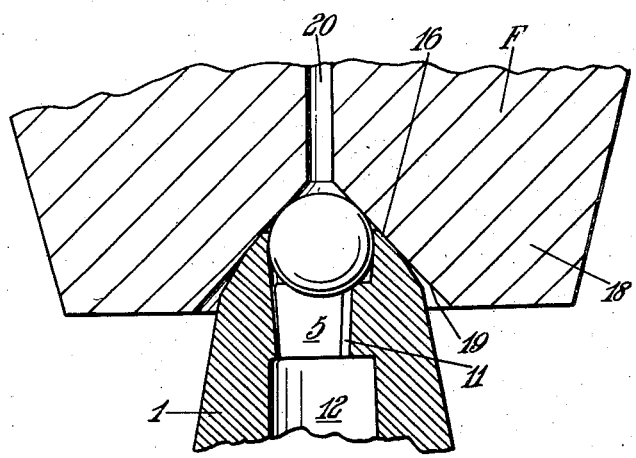
Figure 12:
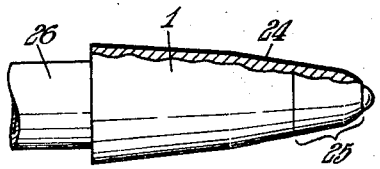

Figure 11 is a detail fragmentary sectional view of the outer end portion of the tip shown in Figure 10 with the constricting tool in the operative position, and Figure 12 is an elevation partly in longitudinal section of a ball point tip with a conventional form of reservoir attachment sleeve, illustrating the application of an ink creep inhibiting area provided in the form of a surface layer or coating. In the sectional portion a full length area is coated while in outside elevation the ink inhibiting area is confined to the part adjacent the ball.

The tip structure shown in Figure 1 is of the usual exterior configuration, its extremity being tapered at an angle $a$ which conveniently is 62°. At this end the tip 1 is formed with a cavity or socket 2 which constitutes the ball housing, the flanks or walling 3 of which being steeply conical and tapering inward with an included angle $b$ of about 10°, the reason for which will be explained below. The base 4 of the cavity may be flat and viewing the cavity as a truncated cone the portion 4 lies in the truncation plane. If the tip is intended to accommodate a ball of 1 mm. in diameter then the base of the cavity is suitably 0.037 inch in diameter. The depth of the cavity is such that when the ball is dropped into it, the equator of the ball lies below the outer end or rim of the cavity (see Figures 5 and 6). Leading to the housing cavity there is a feed duct 5 having an opening to the housing of substantially triangular form as seen in plan in Figure 2. The edges 5a of the opening are common to the duct and the base 4 of the housing and the walls of this feed duct are also suitably tapered in the same sense as the housing, the taper being suitably of an included angle of 10°.

The following dimensions will serve as a guide in forming a nib according to the invention:

Diameter at the bottom of the conical walling 3 of the ball housing 2 _____ min. 0.94 mm.
Cone angle of walling 3, corresponding to the maximum diameter of 0.99 mm. _____ 2°
Cone angle of walling 3, corresponding to the minimum diameter of 0.94 mm. _____ 12°
Width of truncated corners 11 of triangular feed duct opening _____ min. 0.275 mm., max. 0.125 mm.

A core pin A for insertion in the mould for diecasting the ball housing 2 and feed duct 5 is shown in Figures 3 and 4. This core pin, which may conveniently have a shank 6, has a conical part 7 which forms the taper walling 3 of the housing cavity 2 and has an extension or further part 8 which forms the feed duct 5 with a non-circular feed duct opening which in this instance is in substance a triangle. It will be seen that the part 8 may be formed by grinding tapered flats 9 to form the facets of the triangle on to a conical extension of the part 7. These flats do not quite meet at sharp corners but leave between them faces 10 of arcuate or fragmentary conical form cutting off the corners of the triangle. In the die-cast writing instrument tip these faces 10 form and correspond with the faces 11 of the feed duct 5 (see Figures 1 and 2). The meeting of the core pin faces 9 with the base or truncation portion of the part 7 for forming the housing 2 are preferably radiussed as at 9a so that the edges 5a of the duct opening are correspondingly slightly rounded.

The feed duct 5 leads at the end away from the ball housing into an ink supply passage 12 which may be of circular cross-section and is conveniently of larger diameter than the duct 5. This passage 12 is tapered in the opposite direction to that of the feed duct 5 the angle of the taper $c$ being suitably at least 1° to provide the "draw" necessary for the extraction of a core pin or die means which is oppositely disposed with respect to the housing and duct forming core pin when located in the die-casting mould described below. In turn the passage 12 leads into another passage 13 which preferably is of slightly larger size than the passage 12 and which may also be tapered and serves as a socket for the reception of an ink reservoir of known character. In addition, the conical shoulder 12a may serve to support the nib on an anvil (inserted into the socket 13) during the peening or constricting operation described below. The passage 12 and socket 13 are formed by a core pin B (see Figure 8) which may have a shank similar to the shank 6 of the die A. It will therefore be appreciated that whereas the housing cavity 2 and the feed duct 5 will in die-casting be formed by the core pin A (Figures 3 and 4) capable of being extracted axially from the die-cast tip by a movement to the right in Figure 1, the passages 12 and 13 are formed by the core pin B which is extracted by movement to the left of Figure 1.

The die-casting mould parts are assembled. The core pin A for the ball housing and feed duct is introduced in position coaxially with and opposite to the core pin B for the passages 12, 13 (see Figures 8 and 9) within a mould block C bored to provide a recess for forming the external shape chosen for the nib and to provide entries for the core pins A and B. The respective core pins meet in the plane A—A which coincides with the opening of the feed duct 5 to the base 4 of the ball housing. The block C is housed in divisible casing members $D^1$ and $D^2$ through which a conduit 14 is provided for the injection of the casting alloy.

The mould is charged with a tin alloy having suitable proportions of tin to provide the characteristics referred to above and a proportion of another metal or metals adapted to provide the required hardness in the cast nib. Alloys comprising 84% tin and 16% antimony or 89% tin, 9% antimony and 2% cadmium are suitable for producing a good diecasting, and it has been found that such alloys also possess ink creep inhibiting properties.

After the tip carcass body has been cast and the dies A and B extracted, it is removed from the mould and is ready for the insertion of the writing ball and completion of the tip according to the description below. This description will also serve as instructions for the improved mode (referred to above) of forming on edges, such as 5a, ball base seatings which automatically conform to the sphere of the ball, whether the carcass of the tip (with non-circular or polygonal edges 5a) be produced in metal by die-casting or by machining or by coring with punching tools in known manner, or coring by injection moulding in nylon or other suitable plastic by the use of core forming dies similar to those described above.

The writing ball is dropped into the cavity 2 where it lies on the three edges 5a of the triangular opening of the feed duct 5 (see Figure 5). In this attitude the equator 15 of the ball is below the edge of the lip 16 and the conical wall 3 of the cavity is preferably closely spaced from the periphery of the ball. Thereafter by a suitable peening or swaging operation the lip or rim 16 of the cavity is constricted around the ball to retain it and form part-spherical lateral seatings which extend both above and below the equator of the ball (as at 17a and 17b, Figure 6). The lower limit of the lateral seatings will always lie below the equator of the ball because as wear takes place the lateral seatings will be renewed or extended in an inward direction due to the conical form of the walling 3 of the housing.

Furthermore, this constricting operation is also employed for bringing axial pressure to bear on the ball for indenting the part-spherical base seatings 5b (Figures 6 and 7) on the edges 5a. It will be observed that these seatings are separated by the corners 11a of the feed duct opening, which are clear of the ball when inserted to afford by-passes for the ink. Alternatively to using the peening operation to impress the ball to form the base seatings on the edges 5a such seatings may be formed before the constricting operation by pressing an axially directed tool upon the top of the ball and forcing it upon the said edges.

The peening or constricting tool F, Figure 10, is mounted coaxially with an anvil E which is mounted in a block $E^1$. The tip to be operated upon is fitted over the anvil with the shoulder 12a resting upon its top. The head 18 of the tool has a conical recess 19 vented through the passage 20 the dimension and angle of the cone being such that it contacts both the ball and the rim 16. The head 18 is carried by a rod 21 which is mounted for axial displacement and has a fixed collar 22 having a neck 22a for taking the impact of a hammer block 23 which is freely slidable on the rod 19.

When the tool F has been lowered so that the conical recess 18 rests on the outer surface of the rim 16 of the tip 1, the hammer block 23 is released and falls by gravity delivering a sharp blow on the collar. This impact causes the conical recess 18 to constrict the rim 16 upon the ball forming the lateral seatings 17a and 17b and at the same time causes the ball to indent the base seatings 5b (Figure 7) on the edge 5a.

It will be appreciated that there are other methods of retaining the ball in its housing by constricting the rim 16. Such alternative and known methods are for example the application of pressure by pneumatic or other means instead of the impact by a falling weight, or the spinning or rolling over of the rim 16 by a rotary die or set of rollers. In all these cases there is no difficulty in imparting sufficient downward pressure on the ball in order to obtain by indentation the base seatings 5b.

Figure 8:
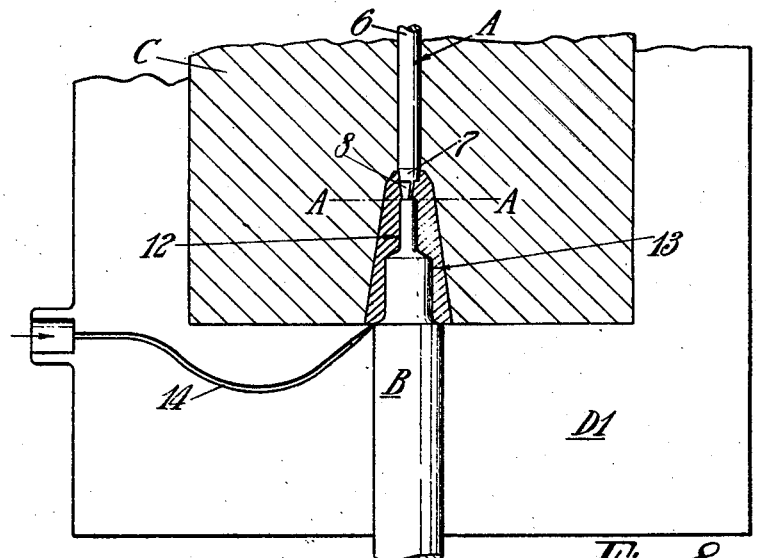
Figure 8 is a sectional diagrammatic elevation representing a mould with the die core means in position, for die-casting the tip.
Figure 9:
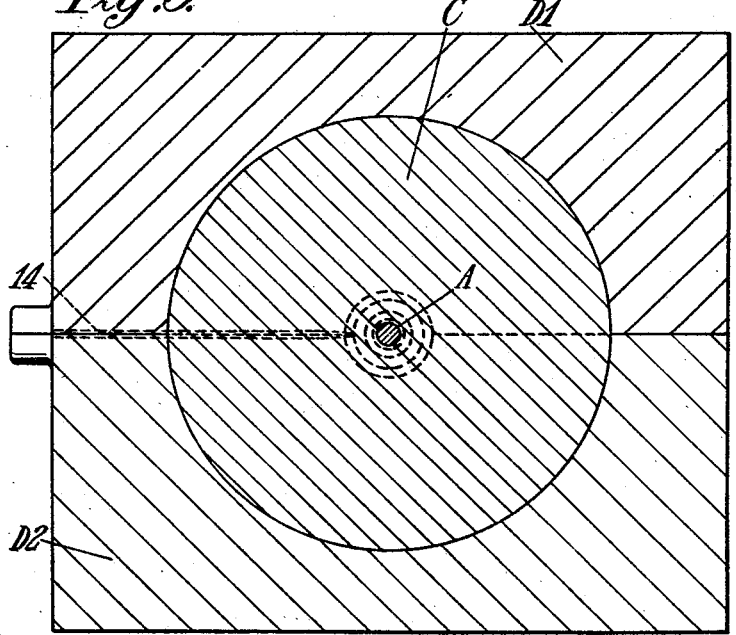
Figure 9 is a plan view of the mould according to Figure 8.

The forms of writing instrument tip shown in Figures 1 and 2 die-cast by the core means and die-casting mould, such as illustrated in Figures 8 and 9, produce a tip body or carcass in finished state which does not require any subsequent machining.

In carrying out the invention where it is desired to endow a tip with ink creep inhibiting properties when such tip is made by any known method out of aluminum alloy, brass or any metal or alloy other than a non-creep tin alloy, or of a non-metallic material, such as for example, nylon, the tip, preferably before the insertion of the ball, is plated or externally coated with a circumferential continuous film of non-creep tin alloy. This may be effected by electric deposition, dipping (where such would be effective as in the case of a brass tip), spraying, chemical deposition or condensation under high vacuum.

The film may be applied to the whole of the exterior of the tip, to the external coned portion or to the part or zone of the latter which lies adjacent the ball.

In Figure 12 a tip is illustrated partially in outside elevation and partially in longitudinal section. On the sectional part of the cone a continuous film of non-creep tin alloy is represented by the thickened lines 24 while on the outside elevation at the lower sides of the Figure the non-creep tin alloy film is shown at 25 as a zone extending from immediately adjacent the ball to part way along the cone. If desired, the portion 26 which represents a known form of extension sleeve in rear of the cone over which is secured the forward end of a tubular ink reservoir, may also be plated or coated externally with non-creep tin alloy. It may be here mentioned that the tip shown in the other figures of the drawings may, if desired, be formed with an extension sleeve similar to the sleeve 26, instead of the socket 12, for receiving the ink reservoir.

I claim:

1. A tip for a ball-point writing instrument comprising a tubular member having a passage for ink therein, a shoulder in said passage adjacent to one end of said member, a ball mounted rotatably in said passage in engagement with said shoulder and extending beyond said one end, said member having at least on outer surface portion adjacent to said ball composed of an ink creep inhibiting tin alloy containing at least about 84% tin and a minor proportion of a hardener for tin.

2. The tip set forth in claim 1, in which said alloy contains between 84% and 89% tin.

3. The tip set forth in claim 1 in which said alloy contains at least 84% tin and at least 11% of at least one hardener metal of the class consisting of antimony and cadmium.

4. The tip set forth in claim 1 in which said alloy consists essentially of about 84% tin and about 16% antimony.

5. The tip set forth in claim 1 in which said alloy consists essentially of about 89% tin, 9% antimony and 2% cadmium.

6. The tip set forth in claim 1 in which said tubular member is composed entirely of said tin alloy.

References Cited in the file of this patent

UNITED STATES PATENTS

| | | |
|---|---|---|
| 1,568,224 | Karafiat | Jan. 5, 1926 |
| 1,695,001 | Wood | Dec. 11, 1928 |
| 2,260,462 | Korsmo | Oct. 28, 1941 |
| 2,390,636 | Biro | Dec. 11, 1945 |
| 2,618,049 | Flummerfelt | Nov. 18, 1952 |
| 2,646,761 | Knobel | July 28, 1953 |
| 2,660,151 | Smith et al. | Nov. 24, 1953 |

FOREIGN PATENTS

| | | |
|---|---|---|
| 213,442 | Switzerland | May 1, 1941 |
| 804,768 | Germany | Apr. 30, 1951 |
| 856,115 | Germany | Nov. 20, 1952 |
| 152,207 | Australia | July 7, 1953 |